United States Patent [19]

Price et al.

[11] Patent Number: 4,769,918
[45] Date of Patent: Sep. 13, 1988

[54] LEVEL INDICATING DEVICE

[76] Inventors: Harry J. Price, 1053 Sixth St.; Paul B. Price, 2025 Feliz Rd., both of Novato, Calif. 94947

[21] Appl. No.: 37,880

[22] Filed: Apr. 13, 1987

[51] Int. Cl.⁴ ............................ G01C 5/04; G01C 9/22
[52] U.S. Cl. ...................................................... 33/367
[58] Field of Search ........................................ 33/367

[56] References Cited

U.S. PATENT DOCUMENTS

| 277,037 | 5/1883 | Grande | 33/367 X |
| 630,856 | 8/1899 | Brown | 33/367 |
| 1,369,235 | 2/1921 | Funk | 33/367 X |
| 2,664,645 | 1/1954 | Qualman | 33/367 |
| 3,816,947 | 6/1974 | Taylor | 33/367 X |

FOREIGN PATENT DOCUMENTS

| 1183702 | 2/1959 | France | 33/367 |
| 2063472 | 6/1981 | United Kingdom | 33/367 |

Primary Examiner—Harry N. Haroian
Attorney, Agent, or Firm—Melvin R. Stidham

[57] ABSTRACT

The invention relates to a level indicating device including a container or reservoir and a length of tubing extending from the container near the bottom thereof. Narrow, inverted cups are adhered to the sides of the container so that they may be slipped over the top of a stake driven into the ground to provide a firm, stable support for the container while the tubing is moved to different locations to establish a reference horizontal plane.

2 Claims, 2 Drawing Sheets

LEVEL INDICATING DEVICE

BACKGROUND OF THE INVENTION

This invention relates to a level indicating device and, more specifically, to a device for locating points in the same horizontal plane by measuring up or down from a reference plane as determined by the level of liquid in an elongated tubing when moved to various locations.

Liquid level has long been employed as a medium for determining points in a single plane, and devices including a reservoir and a length of hose in communication therewith have previously been employed for that purpose. However, such devices generally require at least two people in order to operate them effectively, or they require that the container be set up or installed on a fixed platform or base. In Opazo U.S. Pat. No. 4,356,639, hydrostatic pressure of water in a portable tank is transmitted by hose to a pressure transducer where a difference in height represented by the different pressure is measured. The patent states that the invention requires a topographer and an assistant for transport of the portable tank and the hose.

In From U.S. Pat. No. 4,375,765, a large container at one end of the hose must be placed on a flat, stable surface while the other end is used to establish a horizontal plane.

In Gauthier U.S. Pat. No. 4,422,244, a reservoir is supported on a fixed base and elevations are read at different locations by the level of fluid in the end of the tube relative to the ground level.

OBJECTS OF THE INVENTION

It is an object of this invention to provide a level indicating device that can be operated by an individual in and around a building site without special equipment.

It is a further object of this invention to provide a level indicating device with means for supporting a reservoir in stable position at the building site.

Other objects and advantages of this invention will become apparent from the description to follow, particularly when read in conjunction with the accompanying drawing.

SUMMARY OF THE INVENTION

In carrying out this invention, I provide a reservoir of water or other nonviscous liquid with a long flexible tube extending from the container near the bottom thereof. The container has means such as a chain or the like enabling it to be suspended from a nail, for example, driven into a convenient upright surface. Also secured to the container is at least one inverted cup of small diameter that can be placed over a stake which is driven into the ground at the building site. A length of steel concrete reinforcing bar is ideally suited as a stake.

DESCRIPTION OF A PREFERRED EMBODIMENT

Figure 1:
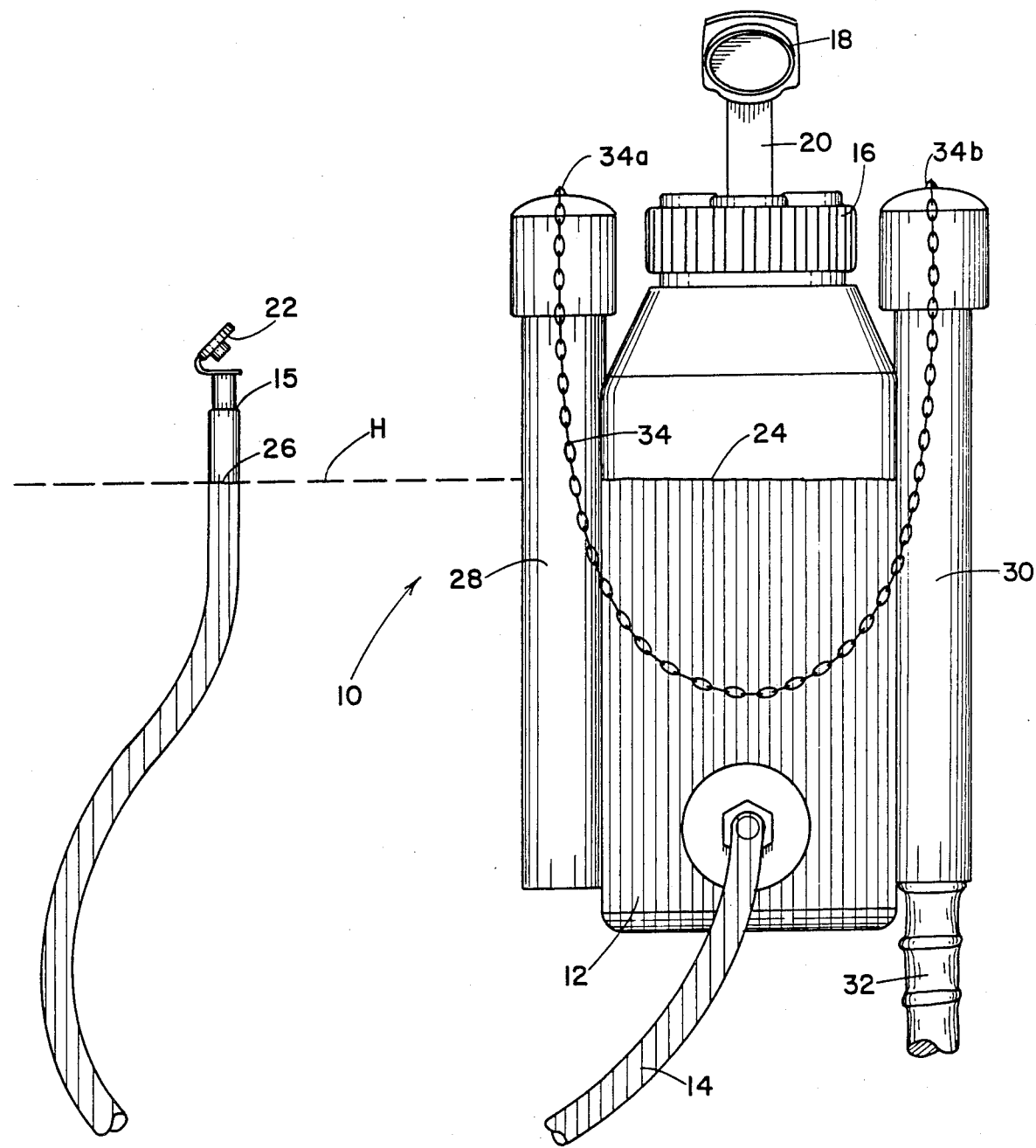
FIG. 1 is an enlarged elevation view of the level indicating device of this invention.

Referring now to the drawings with greater particularity, the level indicating device 10 of this invention includes a main container or reservoir 12 formed by a plastic jar or the like having sufficient capacity, say one quart, to hold a substantial quantity of a suitable liquid, such as water. Where water is used, there is preferably added a dye or coloring to render the liquid more clearly visible through the plastic material of the container 12 as well as a transparent plastic hose or tubing 14, which is connected to the container 12 near the bottom thereof. The hose is preferably of substantial length, say fifty feet, so that, with the container 12 fixed in place, the hose may be carried a substantial distance to establish a horizontal plane over a large area.

The container may be covered with a threaded lid 16 for the purpose of filling the container and a cap 18, which is hinged at 20 to the lid 16 enables the container to be closed fluid-tight when the apparatus is not in use, or being transported. The cap 18 and a small cap 22 at the end of the tubing 14 prevent spilling. In operation, as will be described, the reservoir 12 is placed in a fixed position and the reservoir cap is lifted to expose the liquid surface in the container 12 to atmospheric pressure. Then, the end 15 of the tubing or hose 14 is moved to several locations. In order to prevent spillage, the tubing cap 22 may be kept closed while the tubing is moved about to different locations. At each location, the cap 22 is removed so that both ends of the liquid column will be at atmospheric pressure. Both liquid surfaces 24 and 26 will be in the horizontal plane H.

Bonded or otherwise secured to the sides of the container 12 are inverted, deep cups 28 and 30 of plastic tubing or the like. As shown in FIG. 1, either tube 28 or 30 may be placed over a stake 32 made from a length of steel or concrete reinforcing bar, the reinforcing bar having been driven firmly into the ground at the building site. This provides a stable support for the liquid container 12 at virtually any building site so that a lone operator can establish a fixed horizontal plane corresponding to the level of liquid 24 in the container 12. Of course, the level of liquid 26 in the end of the hose will be at the same plane H and, hence, the hose can be moved to different locations around the container to establish a fixed horizontal plane.

Secured to opposite sides of the container, as by attaching the ends 32a and 32b to the inverted support cups 28 and 30 is a suitable tension member, such as a chain, that enables the container 12 to be suspended from a nail 36 or the like (FIG. 2) that is driven into the wall at any convenient location on an existing upright surface 38, such as a building wall.

The apparatus of this invention can be used in a number of different ways to establish a horizontal plane. For example, if the operator wishes to assess the settling in the foundation of a building, the reservoir 12 is first placed in a fixed position, as by suspending it from a nail or the like driven into the wall. The end of the tubing 14 is then moved to various locations within the building and, at each location, a mark is made on the wall to indicate the liquid level. The marks so made will all be in the same horizontal plane in space. Then, the operator simply measures down to the floor from each of the marks so made and notes any differences or deviations from a common plane, taking into account the different thicknesses of finished floor coverings.

Figure 2:
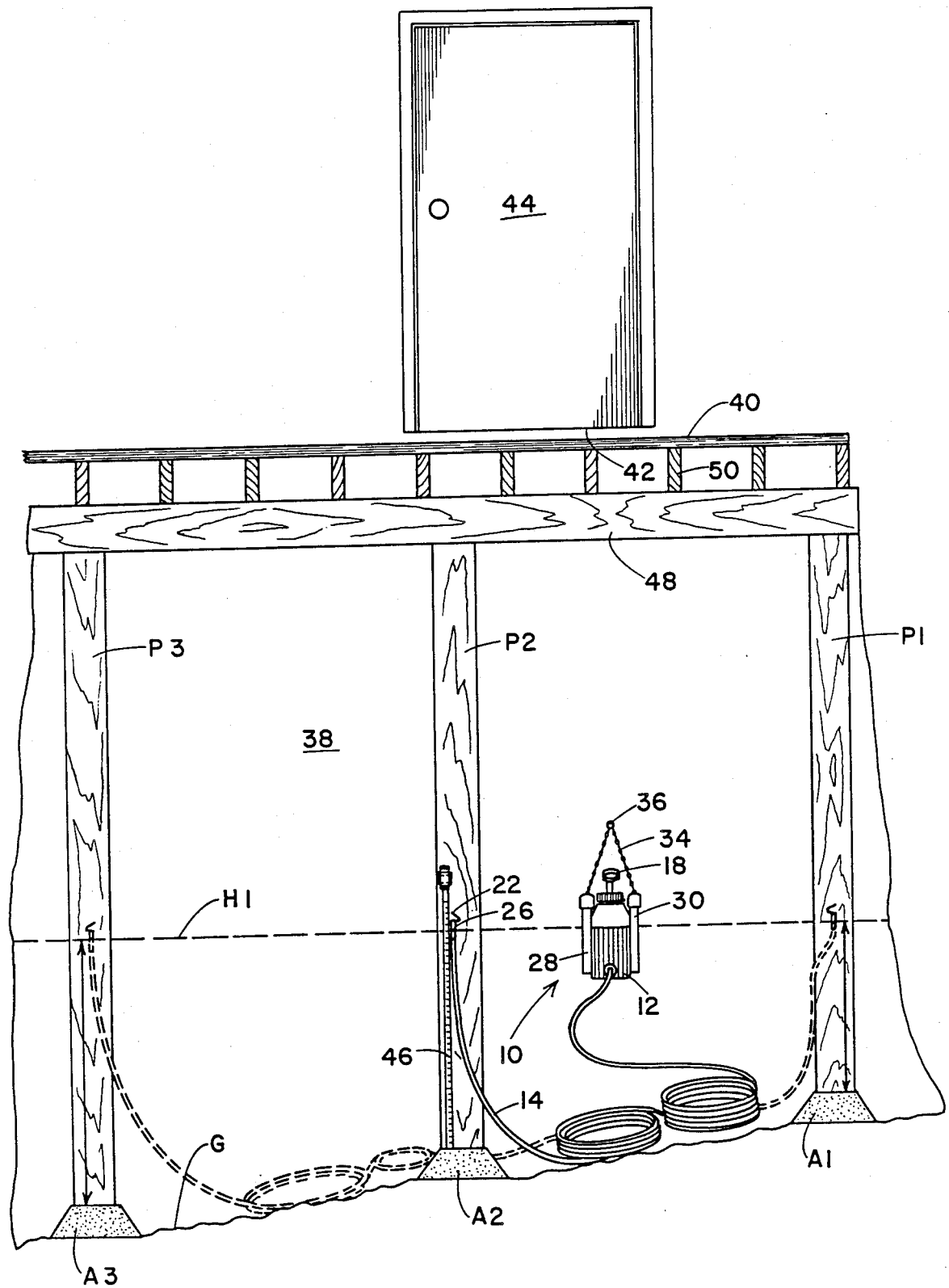
FIG. 2 is an elevation view of a building showing the device of this invention in use.

The level indicating device 10 of this invention may also be used to determine the height of support posts or columns $P_1$, $P_2$ and $P_3$ for a deck 40, as shown in FIG. 2. Suppose, for example, one wishes to build a deck 40 extending from a vertical wall 38 and above a sloped grade G. The piers $A_1$, $A_2$ and $A_3$ are set at various locations spaced from the building wall 38 and support posts $P_1$, $P_2$ and $P_3$ for the deck are to be positioned on the piers. With the device of the present invention, the heights of the various posts can be determined without raising them until they are ready for installation.

First, the reservoir or bottle 12 is placed, as by suspending it from a nail 36 at any location convenient to the location of the piers. A mark is made against the building corresponding to the water level. This establishes the reference horizontal plane $H_1$. The carpenter then measures up from plane $H_1$, as represented by the mark, to the sill 42 of the door 44 that will be serving the deck. Suppose, for example, that this is found to be seven feet, ten inches. Suppose also that the plans call for a lip of one-half inch below the door sill and for the deck slope for drainage, so that the deck, at the location above the piers $A_1$, $A_2$, and $A_3$ will be two inches lower than at the door 44. The height of the deck surface above the water level or plane $H_1$ will then be two and one-half inches less, or seven feet, seven and one-half inches.

In order to determine the height of the posts above the plane $H_1$, the carpenter must further subtract the thickness of the decking 40, as well as the widths of the girder 48 and joists 50. The height to be substracted is as follows:

| Thickness of decking | 1¼″ |
|---|---|
| Width of joists | 7½″ |
| Width of girder | 9½″ |
| | 18¼″ = 1′ 6¼″ |

Therefore the tops of the posts will be 7′ 1½″ − 1′ 6¼″ or 5′7″ above reference plane $H_1$.

Then, the tubing 14 is carried out to each pier $A_1$, $A_2$ and $A_3$ and, with a suitable tape measure 46, the carpenter then measures up from that pier to reference plane $H_1$, as represented by the water level 26 in the tubing 14. Say, the height from pier $A_1$ to the water level is determined to be one foot six and one-half inches; the height from pier $A_2$ to the water level is determined to be two feet and one inch and the height from pier $A_3$ to the water level is determined to be three feet and nine and three-eights inches. The height of the posts above the water level or plane $H_1$, or 5′7″, is added to each of these measurements. Therefore, for post $P_1$ there is a total height or post length of 5′7″+1′6½″=7′1½″; post $P_2$ is to be cut to a length of 5′7″+2′1″=7′8″ and post $P_3$ is to be cut to a length of 5′7″+3′9⅜″=9′4⅜″.

Then when the posts are cut to the desired lengths and raised for installation, their top surfaces will be perfectly level to one another and at the proper height for supporting the girder 48, the joists 50 and the decking 40.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. A level indicating device comprising:
   a container having an unobstructed flat bottom for support on a flat surface;
   a long transparent, flexible tube connected to said container near the bottom thereof;
   an opening in said container near the top thereof;
   a first cap for sealing off said opening to make said container watertight during transport and storage, said cap being easily removed;
   a second cap for sealing off the end of said tube, said second cap being easily removed;
   an inverted deep cup formed from a vertical length of small diameter tubing secured to the side of said container to extend substantially the full height thereof with an open bottom above the flat bottom of said container for closely receiving the top of a standard concrete reinforcing bar stake and supporting said container thereon;
   a tension member secured at opposite ends thereof to said container on opposite sides thereof and near the top thereof to enable said container to be suspended from a generally horizontal member; and
   means closing the top of said length of tubing.

2. The level indicating device defined by claim 1 wherein:
   there are two inverted deep cups secured to said container on opposite sides thereof; and
   the opposite ends of said tension member are secured to the closed tops of said deep cups.

* * * * *